United States Patent [19]

Mitsuhashi et al.

[11] Patent Number: 5,049,308
[45] Date of Patent: Sep. 17, 1991

[54] FERROELECTRIC SMECTIC LIQUID CRYSTAL COMPOUND AND COMPOSITION CONTAINING THE SAME

[75] Inventors: Shigeru Mitsuhashi; Hitoshi Kondo; Tetsuharu Okazaki; Shinji Endoh; Hiroko Kudo; Akio Yamaguchi; Haruki Tsuruta; Susumu Akutagawa, all of Tokyo, Japan

[73] Assignee: Takasago International Corporation, Tokyo, Japan

[21] Appl. No.: 372,582

[22] Filed: Jun. 27, 1989

Related U.S. Application Data

[62] Division of Ser. No. 137,281, Dec. 23, 1987, Pat. No. 4,886,623.

[30] Foreign Application Priority Data

Dec. 23, 1986 [JP] Japan ................... 61-305341

[51] Int. Cl.$^5$ .................... C09K 19/20; C07C 69/76
[52] U.S. Cl. ................ 252/299.67; 252/299.01; 252/299.6; 560/73
[58] Field of Search ........... 252/299.01, 299.6, 299.67; 560/73; 568/331, 631

[56] References Cited

U.S. PATENT DOCUMENTS

| | | |
|---|---|---|
| 4,083,797 | 4/1978 | Oh .................. 252/299.67 |
| 4,647,398 | 3/1987 | Saito et al. ........... 252/299.67 |
| 4,710,585 | 12/1987 | Taguchi et al. ............ 560/64 |
| 4,764,619 | 8/1988 | Gunjima et al. ........... 252/299.67 |
| 4,812,259 | 3/1989 | Yoshinaga et al. ......... 252/299.67 |
| 4,828,754 | 5/1989 | Takehara et al. .......... 252/299.67 |
| 4,834,907 | 5/1989 | Inoue et al. ............. 252/299.67 |
| 4,917,821 | 4/1990 | Mori et al. .............. 252/299.67 |
| 4,925,592 | 5/1990 | Kano ..................... 252/299.67 |
| 4,943,387 | 7/1990 | Furukawa et al. ......... 252/299.67 |
| 4,946,989 | 8/1990 | Kawamura et al. ......... 252/299.67 |
| 4,970,023 | 11/1990 | Hirai et al. ............. 252/299.66 |

FOREIGN PATENT DOCUMENTS

| | | |
|---|---|---|
| 310403 | 4/1989 | European Pat. Off. ....... 252/299.67 |
| 315193 | 5/1989 | European Pat. Off. ....... 252/299.67 |
| 341686 | 11/1989 | European Pat. Off. ....... 252/299.67 |
| 3743965 | 7/1988 | Fed. Rep. of Germany ........... 252/299.67 |
| 88/07518 | 10/1988 | World Int. Prop. O. ...... 252/299.67 |

OTHER PUBLICATIONS

Nishiyama, I. et al., Jpn. J. Appl. Phys., Part 2, 29(2), L326, 1990.

*Primary Examiner*—Robert L. Stoll
*Assistant Examiner*—Richard Treanor
*Attorney, Agent, or Firm*—Sughrue, Mion, Zinn, Macpeak & Seas

[57] ABSTRACT

A liquid crystal compound represented by formula:

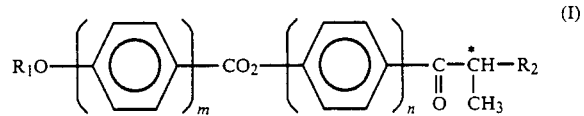

(I)

wherein $R_1$ represents a straight chain alkyl group having from 4 to 18 carbon atoms; $R_2$ represents a straight chain alkyl group having from 2 to 6 carbon atoms or a branched alkyl group having from 3 to 6 atoms and having a methyl group as a side chain; and m and n each represents 1 or 2, is disclosed.

The liquid crystal compound of formula (I) is optically and electrically stable and exhibits fast electro-optical switching in image display.

5 Claims, No Drawings

FERROELECTRIC SMECTIC LIQUID CRYSTAL COMPOUND AND COMPOSITION CONTAINING THE SAME

This is a division of application Ser. No. 07/137,281, filed Dec. 23, 1987, now U.S. Pat. No. 4,886,623.

FIELD OF THE INVENTION

This invention relates to a liquid crystal compound exhibiting fast electro-optical switching in display devices. The compound of this invention is suitable for use in an image display device for a liquid crystal television receiver unit, a photo-printer head, and the like.

BACKGROUND OF THE INVENTION

Liquid crystals are now widespread as one of image display elements. Commonly adopted image display modes using liquid crystal materials include TN (twisted nematic) type display mode and G-H (guest-host) type display mode. Both of TN and G-H type display systems utilize nematic liquid crystals and, under the state of the art, show slower response as compared with other image display materials, such as a CRT, a plasma display, an electroluminescence display, etc.

Nevertheless, the image display system using liquid crystals is advantageous in that it is little fatigue of eyes and an electric power consumption is low. Further, with the recent increase of needs for large-sized and high-density display elements, it has been demanded to speed up the response of liquid crystal display elements which are suitable for constructing thin and light display devices. In recent years, ferroelectric liquid crystals have been developed as display materials having fast switching time, and image display devices taking advantage of their rapid electro-optical switching phenomenon have been proposed. Ferroelectric liquid crystals were reported in R.B. Meyer et al., *J. de Phys.-Lett.*, Vol. 36, 69 (1975), and they are considered to exhibit a chiral smectic C phase, a chiral smectic F phase, a chiral smectic I phase, a chiral smectic G phase, etc. (hereinafter referred to as $S_c^*$ phase, $S_F^*$ phase, $S_I^*$ phase, or $S_G^*$ phase, respectively) according to the liquid crystal classification. Of these phases, the $S_c^*$ phase has the fast switching time and is believed to have the highest possibility of practical use in view of the phase structure and viscosity attributed to the phase structure.

In fact, N.A. Clark et al. observed an electrooptical switching phenomenon of microsecond order when p-decyloxybenzylidene-p'-amino-2-methylbutyl cinnamate (hereinafter abbreviated as DOBAMBC) that is one of the ferroelectric liquid crystal compounds and exhibits the $S_c^*$ phase is sealed up within a very thin cell, as reported in *Applied Phys. Lett.*, Vol. 36, 899 (1980). Studies on application of the ferroelectric liquid crystals (especially in the $S_c^*$ phase thereof) to electro-opticals, such as liquid crystal TV sets, photo-printer heads, nonlinear optical elements, and the like, taking advantage of such a high response rate, have already been taken up.

The response time $\tau$ of ferroelectric liquid crystals is represented by the following equation:

$$\tau = \frac{\eta}{P_s \cdot E}$$

wherein $P_s$ represents a spontaneous polarization value; E represents an electric field; and $\eta$ represents a rotational viscosity (viscosity concerned in switching) [cf. Okano & Kobayashi, *Ekisho, Kiso-hen*, pp. 152-153, Baifu-kan (1985)].

As can be seen from this equation, spontaneous polarization has close relations with the response time, and it is considered that a liquid crystal compound having greater spontaneous polarization exhibits a higher response rate. However, spontaneous polarization of DOBAMBC is as small as about 3 $nC/cm^2$. Therefore, introduction of various structural modifications have been suggested in order to attain larger spontaneous polarization. Since the very small spontaneous polarization of ferroelectric liquid crystals for the dipole moment possessed by themselves is believed to be ascribed to the influences of free rotation of a bond in the molecule, it has been proposed to introduce a structure in which free rotation between an optically active group (asymmetric carbon) and a chromophoric group is restricted, i.e., a structure in which an asymmetric carbon atom is adjacent to a chromophoric group. For example, Japanese Patent Application (OPI) No. 67453/85 (the term "OPI" as used herein means an "unexamined published Japanese patent application") discloses a structure of formula :

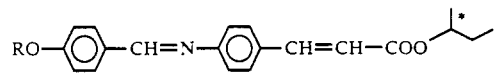

which has a spontaneous polarization value of 17 $nC/cm^2$, and Japanese Patent Application (OPI) No. 207486/86 discloses a structure of formula:

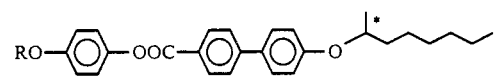

which has a spontaneous polarization value of from 80 to 100 $nC/cm^2$. Thus, liquid crystal compounds having these optically active groups solely composed of an alkyl group exhibit increased spontaneous polarization reaching about 100 $nC/cm^2$.

Further, optically active groups having introduced thereinto a hetero atom (especially a halogen atom) have also been proposed. For example, the compounds having a structure of formula:

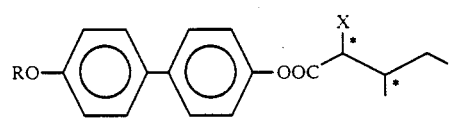

wherein X represents a chlorine atom or a bromine atom, have spontaneous polarization values reaching 220 $nC/cm^2$, as disclosed in Japanese Patent Application (OPI) No. 218358/85. These liquid crystal compounds show the highest spontaneous polarization among the so far developed ferroelectric liquid crystals (particularly $S_c^*$ phase). However, in cases when such halogen-substituted compounds are used as display materials, they are regarded unstable optically and electrically and are, therefore, unsuitable for practical use.

In the light of the above-described circumstances, it has been keenly demanded to develop an optically and electrically stable liquid crystal compound having a spontaneous polarization value of 200 nC/cm² or higher in its $S_c^*$ phase.

Basic requirements for ferroelectric liquid crystals to have large spontaneous polarization values of 200 nC/cm² or more and to be practically usable seem to be that an asymmetric carbon atom is close to a chromophoric group to form an optically and electrically stable structure; that there is a dipole moment having a vector component perpendicular to major axis of the molecule; and that the liquid crystals show an $S_c^*$ phase. In pursuit of liquid crystal compounds satisfying these requirements, a number of compounds have now been developed. However, as mentioned above there has been developed only one type of liquid crystal compound having a large spontaneous polarization value of 200 nC/cm² or higher, in which a hetero atom, such as a halogen atom, is introduced to the asymmetric carbon.

SUMMARY OF THE INVENTION

Accordingly, one object of this invention is to provide a liquid crystal compound which is optically and electrically stable and has a spontaneous polarization value of 200 nC/cm² or higher in its $S_c^*$ phase and a liquid crystal composition containing the same.

The inventors have instituted extensive researches into ferroelectric liquid crystal compounds exhibiting an $S_c^*$ phase and having a spontaneous polarization value of 100 nC/cm² or more in the $S_c^*$ phase, paying their attention to the molecular structures, inclusive of the optically active groups. As a result, it has now been found that many liquid crystal compounds having introduced therein a keto group having an asymmetric carbon adjacent thereto exhibit an $S_c^*$ phase and have a spontaneous polarization value of 200 nC/cm² or more. The present invention has been completed based on this finding.

The present invention relates to a liquid crystal compound represented by formula (I)

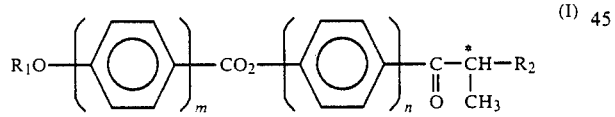

(I)

wherein $R_1$ represents a straight chain alkyl group having from 4 to 18 carbon atoms; $R_2$ represents a straight chain alkyl group having from 2 to 6 carbon atoms or a branched alkyl group having from 3 to 6 carbon atoms and having a methyl group as a side chain; and m and n each represents 1 or 2.

DETAILED DESCRIPTION OF THE INVENTION

In formula (I), $R_2$ preferably represents an ethyl group or a 4-methylpentyl group. The compounds of formula (I) wherein $R_2$ is an ethyl or 4-methylpentyl group exhibit a particularly stable $S_c^*$ phase. Introduction of a branched alkyl group having an alkyl side chain containing 2 or more carbon atoms, e.g., ethylpropyl, ethylbutyl, propylbutyl groups, unfavorably reduce thermal stability of the liquid crystals.

Compounds having a carbon chain, e.g., a methylene group, an ethylene group, etc., between the keto group and the asymmetric carbon atom have reduced spontaneous polarization as shown in Comparative Example 1 hereinafter described.

The liquid crystal compounds according to the present invention may be mixed with conventionally known ferroelectric liquid crystals or liquid crystals that merely show $S_c$ phase and do not exhibit ferroelectricity to thereby provide liquid crystal compositions which have an extended temperature range for the $S_c^*$ phase and are suitable for practical use as display devices. Further, some of the compounds of the present invention exhibit poor liquid crystal properties, but such may be added to compounds which exhibit an $S_c$ phase or an $S_c^*$ phase in a proportion of from about 5 to 20% by weight to provide ferroelectric liquid crystal compositions having larger spontaneous polarization.

The liquid crystal compound represented by formula (I) can generally be synthesized through the following reactions. A 4-hydroxyaryl bromide is converted to a benzyl ether in a usual manner, which is then reacted with metallic magnesium to prepare a Grignard reagent. An optically active aldehyde is reacted on the resulting Grignard reagent to obtain an alcohol compound. The alcohol compound is oxidized with chromium (VI) oxide to obtain a ketone derivative. The resulting ketone derivative is hydrogenated in the presence of palladium-on-carbon to obtain a 4-hydroxyarylketone compound.

The thus prepared 4-hydroxyarylketone compound and a 4-n-alkyloxyarylcarboxylic acid are reacted in methylene chloride in the presence of N,N'-dicyclohexylcarbodiimide to obtain an ester compound. The resulting product is purified by silica gel column chromatography and recrystallization to yield the desired product. The structure of the resulting liquid crystal compound was identified through NMR analysis and mass spectrometric analysis.

Typical examples of the liquid crystal compounds represented by formula (I) are shown below.

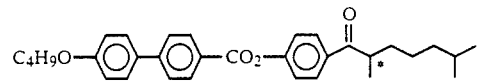

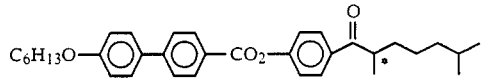

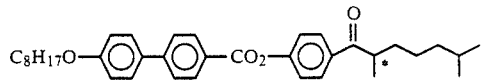

(Compound of Example 5)

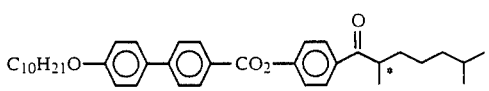

(Compound of Example 6)

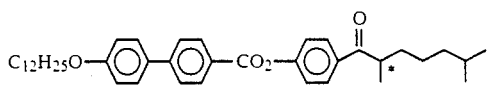

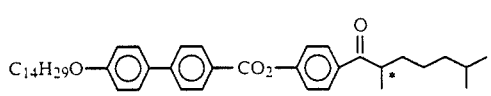

-continued
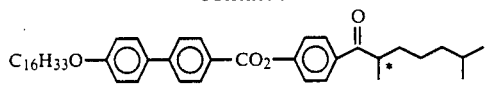
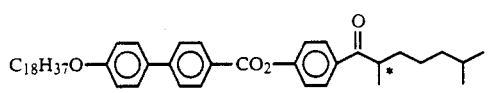
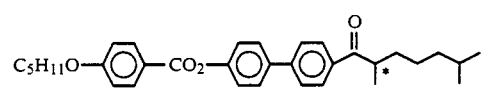
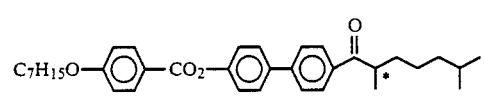
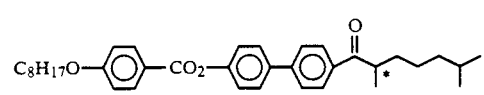
(Compound of Example 8)
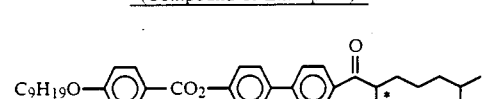
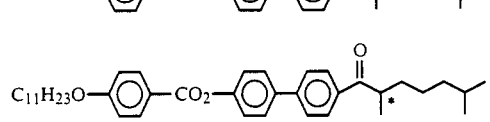
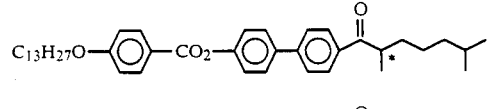
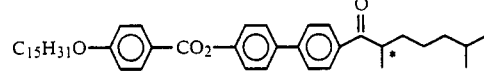
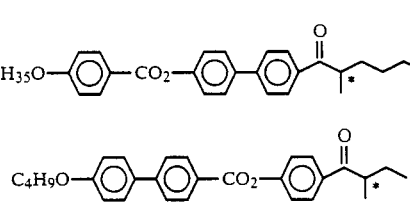
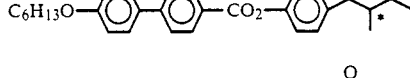
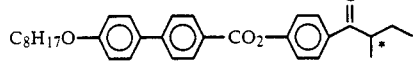
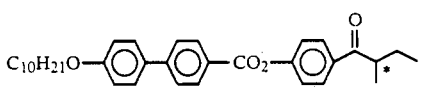
(Compound of Example 7)
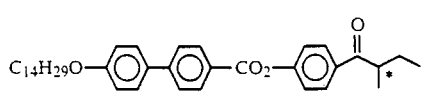
-continued
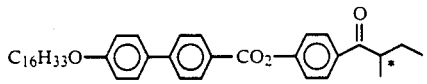
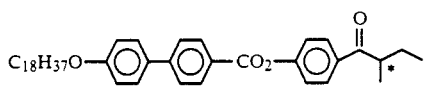
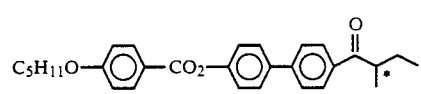
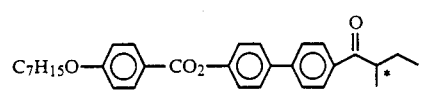
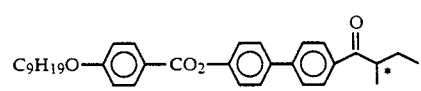
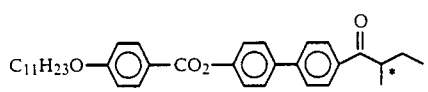
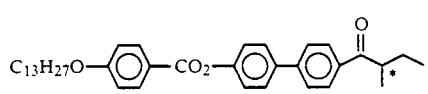
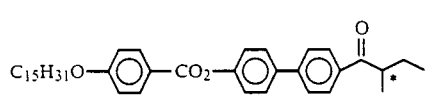
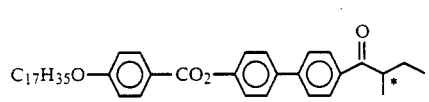
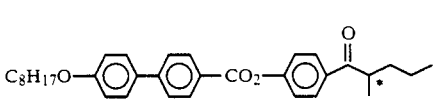
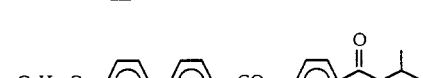
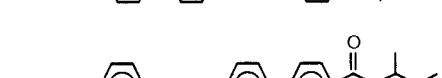
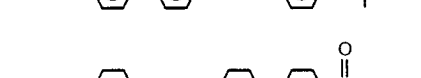

-continued

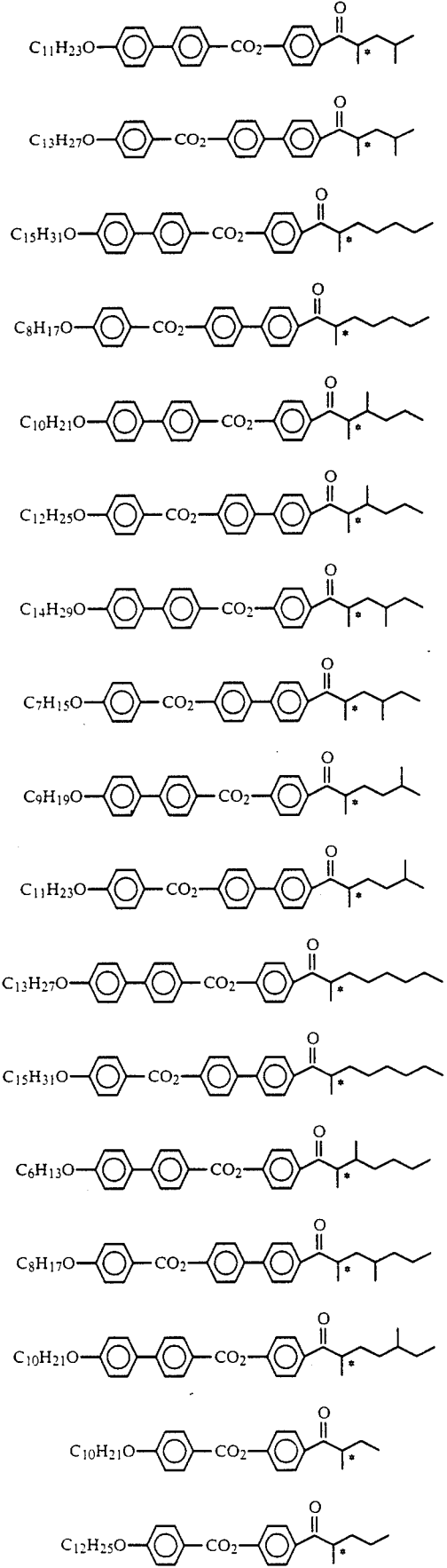

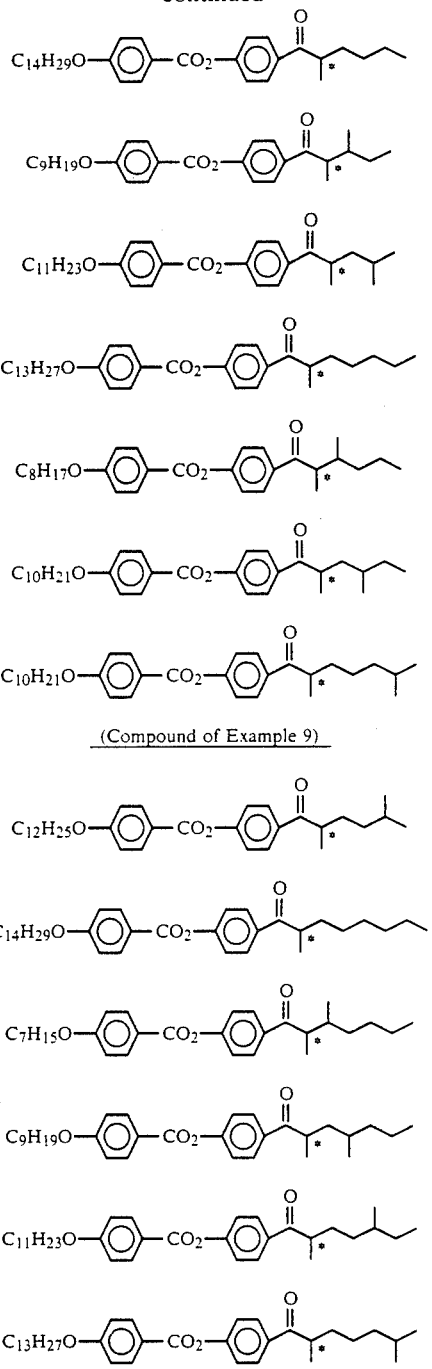

(Compound of Example 9)

The present invention is now illustrated in greater detail with reference to Examples, Comparative Examples, and Application Examples, but it should be understood that the present invention is not deemed to be limited thereto.

EXAMPLE 1

Synthesis of 4-Bromophenyl Benzyl Ether

To 200 ml of acetone were added 63.5 g of benzyl chloride, 95.15 g of 4-bromophenol, and 69.1 g of potassium carbonate, and the mixture was allowed to react at reflux for 8 hours. After completion of the reaction, the reaction mixture was added into 200 ml of water and extracted with 200 ml of chloroform. The extract was washed with 200 ml of water to obtain a crude product. The crude product was distilled by a Claisen flask to obtain 108.1 g of a distillate, which was further purified by silica gel column chromatography using benzene as an eluent to give 96 g (theoretical yield: 73%) of the entitled compound having a melting point of 47° C.

EXAMPLE 2

Synthesis of 4-(2,6-Dimethyl-1-hydroxyheptyl) phenyl Benzyl Ether

In a 200 ml-volume flask was charged 1 704 g of metallic magnesium. After displacing the atmosphere with nitrogen, a small amount of iodine was added thereto, followed by heating to activate the magnesium. Ten milliliters of tetrahydrofuran (THF) were added thereto, and a mixture comprising 18.5 g of 4-bromophenyl benzyl ether as prepared in Example 1 and 40 ml of THF was added dropwise to the system from a dropping funnel at room temperature over a period of 30 minutes. The reaction was continued at a refluxing temperature of THF for an additional 2.5 hours to prepare a Grignard reagent. To the resulting Grignard reagent was added a mixture of 10.0 g of (S)-2,6-dimethylheptanal and 30 ml of THF at 15° C., followed by allowing the mixture to react for 2 hours while keeping at that temperature. The reaction mixture was treated with diluted hydrochloric acid, neutralized with a sodium bicarbonate aqueous solution, and washed with water to obtain 21.8 g of a crude product. Purification by silica gel column chromatography (eluent: benzene) yielded 11.8 g (theoretical yield: 47%) of the entitled compound as a viscous yellow liquid.

EXAMPLE 3

Synthesis of 4-(2,6-dimethyl heptanoyl)phenyl Benzyl Ether

To a mixture of 11.8 g of the benzyl ether as prepared in Example 2 and 160 ml of acetic acid was added a mixture of 53 ml of acetic acid, 13.3 ml of water, and 7.5 g of chromium (IV) oxide over a period of 30 minutes while maintaining at 20° C. The reaction was continued at that temperature for an additional 1 hour. After 400 ml of methanol was added thereto, the reaction mixture was distilled under reduced pressure to remove the methanol and acetic acid. To the residue was added 300 ml of water, and the mixture was adjusted to a pH of 9 with a 5 wt % aqueous solution of sodium hydroxide, followed by extraction with 100 ml of diethyl ether. The ethereal layer was washed twice with water, and the diethyl ether was distilled off to obtain 8.1 g of a crude product. Purification of the crude product by silica gel column chromatography (eluent: benzene) gave 7.1 g (theoretical yield: 66,5%) of the entitled compound as a yellow liquid.

EXAMPLE 4

Synthesis of 4-(2,6-Dimethylheptanoyl)phenol

In a 50 ml-volume eggplant-type flask equipped with a three-way cock were charged 2 g of the benzyl ether as prepared in Example 3, 10 ml of methanol, and 0.2 g of 10% palladium-on-carbon to effect hydrogenation at ambient temperature under normal pressure. Absorption of hydrogen completed within 2 hours. The catalyst was removed by filtration, and the methanol was distilled off from the filtrate under reduced pressure to obtain 1.46 g (theoretical yield: 99%) of the entitled compound as a pale brown, highly viscous liquid.

Specific Rotatory Power $[\alpha]_D^{24}$: +22.1°

EXAMPLE 5

Synthesis of 4'-n-Octyloxybiphenyl-4 -carboxylic Acid-4"-(2,6-dimethylheptanoyl)phenyl Ester In a 200 ml-volume flask were charged 1.39 g of 4'-octyloxybiphenyl-4-carboxylic acid, 0.054 g of 4-dimethylaminopyridine, 1.0 g of the phenol as prepared in Example 4, and 70 ml of dichloromethane, followed by cooling to 0° C. To the mixture was added 1.15 g of N,N'-dicyclohexylcarbodiimide, and the mixture was allowed to react at that temperature for 2 hours. The produced amine salt was removed by filtration, and the filtrate was distilled under reduced pressure to remove the dichloromethane. The resulting crude product was recrystallized from 100 ml of ethanol to obtain 1.2 g (theoretical yield: 51.8%) of the entitled compound having a melting point of 84° C.

Specific Rotatory Power $[\alpha]_D^{24}$: +5.05°

MS: 542 (M+)

NMR: δ(ppm, CDCl$_3$) 0.85 (6H, d, J=6.6 Hz), 0.90 (3H, t, J=7.0 Hz), 1.21 (3H, d, J=6.8 Hz), 1.18-1.52 (16H, m), 1.81 (3H, m), 3.47 (1H, m), 4.01 (2H, t, J=6.6 Hz), 7.00 (2H, m), 7.35 (2H, m), 8.05 (2H, m), and 8.23 (2H, m)

EXAMPLE 6

Synthesis of 4'-n-decyloxybiphenyl-4-carboxylic Acid-4"-(2,6-dimethylheptanoyl)phenyl Ester 4.65 g of 4-(2,6-dimethylheptanoyl)phenol (4.65 g) and 3.1 g of 4'-decyloxybiphenyl-4-carboxylic acid were reacted in the same manner as in. Example 5. The crude product was purified by recrystallization to give 3 g (theoretical yield: 40%) of the entitled compound having a melting point of 83.7° C.

Specific Rotatory Power $[\alpha]_D^{24}$: +5.31°

MS: 570 (M)

NMR: δ(ppm, CDCl$_3$) 0.85 (6H, d, J=6.6 Hz), 0.89 (3H, t, J=7.0 Hz), 1.21 (3H, d, J=6.8 Hz), 1.61-1.52 (20H, m), 1.81 (3H, m), 3.47 (1H, m), 4.01 (2H, t, J=6.6 Hz), 7.01 (2H, m), 7.35 (2H, m), 8.05 (2H, m), 8.24 (2H, m)

EXAMPLE 7

Synthesis of 4'-n-Dodecyloxybiphenyl-4-carboxylic Acid-4"-(2-methylbutanoyl)phenyl Ester The procedures of from Example 1 through Example 5 were repeated, except for replacing the (S)-2,6-dimethylheptanal and 4'-octyloxybiphenyl-4-carboxylic acid with (5)-2-methylbutanal and 4'-dodecyloxybiphenyl-4-carboxylic acid, respectively. The resulting crude product was recrystallized from hexane to obtain the entitled compound having a melting point of 67° C. and a purity of 99.6% in a theoretical yield of 20.4% (from 2-methylbutanal).

Specific Rotatory Power $[\alpha]_D^{24}$: +10.94°

MS: 542 (M+)

NMR: δppm, CDCl$_3$) 0.88 (3H, t, J=6.9 Hz), 0.94 (3H, t, J=7.5 Hz), 1.22 (3H, d, J=6.8 Hz), 1.27 (18H, m), 1.50 (2H, m), 1.83 (2H, m), 3.40 (1H, m), 4.02 (2H, m), 7.01 (2H, m), 7.35 (2H, m), 7.60 (2H, m), 7.71 (2H, m), 8.05 (2H, m), and 8.24 (2H, m)

EXAMPLE 8

Synthesis of 4-n-Octyloxybenzoic Acid-4'-(2,6-dimethylheptanoyl)-4"-biphenyl Ester (a) 4-Bromo-4'-biphenyl benzyl ether was obtained in the same manner as in Example 1, except for replacing 4-bromophenol with 4-bromo-4'-hydroxybiphenyl.

(b) A mixture comprising 12 g of the above-obtained benzyl ether and 100 ml of THF was added to a mixture comprising 0.89 g of magnesium, 10 ml of THF, and a small amount of iodine to prepare a Grignard reagent. To the Grignard reagent was added a mixture of 5 g of (S)-2,6-dimethylheptanal and 5 ml of THF over a period of about 15 minutes, and the mixture was allowed to react at room temperature for 3 hours. After completion of the reaction, THF was removed by distillation under reduced pressure. The residue was extracted with benzene, and the extract was washed successively with water, sodium bicarbonate aqueous solution, and water. The benzene was removed by distillation, and the residue was purified by silica gel column chromatography (eluent: benzene) to obtain 4.2 g of 4-(2,6-dimethyl-1-hydroxyheptyl)-4'-biphenyl benzyl ether.

(c) The benzyl ether (4.2 g) as prepared in (b) was reacted in the same manner as in Example 3 to obtain 3 g of 4-(2,6-dimethylheptanoyl)-4,-biphenyl benzyl ether. Purification by column chromatography was carried out using chloroform as an eluent.

(d) The product as prepared in (c) was subjected to hydrogenation under normal pressure in the same manner as in Example 4. The crude product was purified by silica gel column chromatography using a mixed solvent of benzene and ethyl acetate (20:1 by volume) as an eluent to obtain 1.4 g of 4-hydroxy-4'-(2,6-dimethylheptanoyl)biphenyl.

(e) To 20 ml of dichloromethane were added 1 g of the biphenyl derivative as prepared in (d), 0.8 g of 4-octyloxybenzoic acid, 0.04 g of 4-dimethylaminopyridine, and 0.87 g of N,N'-dicyclohexylcarbodiimide, and the mixture was allowed to react at 15 to 20° C. for 3 hours. The produced amine salt was separated by filtration, and the dichloromethane was removed from the filtrate by distillation under reduced pressure to obtain 2.8 g of a crude product. The crude product was subjected to silica gel column chromatography (eluent: benzene) and then recrystallized from n-heptane to obtain 1.16 g of a crystal of 4-n-octyloxybenzoic acid-4'-(2,6-dimethylheptanoyl-4"-biphenyl ester having a melting point of 75° C.

Specific Rotatory Power $[\alpha]_D^{24}$: +1.6°

MS: 542 (M+)

NMR: $\delta$(ppm, CDCl$_3$) 0.88 (9H, m), 1.36 (19H, m), 1.83 (3H, m), 3.5 (1H, m), 4.06 (2H, t, J=6.54 Hz), 7.0 (2H, m), 7.33 (2H, m), 7.69 (4H, m), 8.04 (2H, m), and 8.17 (2H, m)

EXAMPLE 9

Synthesis of 4-n-Decyloxybenzoic Acid-4'-(2,6-dimethylheptanoyl)phenyl Ester

One gram of 4-(2,6-dimethylheptanoyl)phenol as prepared in Example 4 and 1.18 g of 4-decyloxybenzoic acid were reacted in the same manner as in Example 5 to obtain 1.3 g (theoretical yield: 61.9%) of the entitled compound having a melting point of 52° C.

MS: 494 (M+)

NMR: $\delta$(ppm, CDCl$_3$) 0.90 (9H, d, J=6.7 Hz), 1.35 (24H, m), 1.82 (2H, m), 3.42 (1H, m), 4.05 (2H, m), 6.97 (2H, m), 7.34 (2H, m), 8.06 (2H, m), and 8.16 (2H, m)

EXAMPLE 10

Liquid crystal characteristics of the 4'-n-octyloxybiphenyl 4-carboxylic acid-4"-(2,6-dimethylheptanoyl)phenyl ester as obtained in Example 5 were determined as follows.

A transparent electrode was formed on a glass plate, and the surface was coated with a high polymer film, followed by rubbing unidirectionally. Two bases thus prepared were assembled into a cell with a 3 μm thick spacer therebetween in such a manner that the rubbing directions of the two bases are parallel. The above-identified liquid crystal compound was sealed up within the cell. When a square wave alternating current of ±20 V was applied to the liquid crystal cell, the electrooptical effects were observed by means of an He-Ne laser and a photomultiplier, and the liquid crystal cell was found not only to make a clear contrast but also to have a fast response time, indicating practical usability as liquid crystal display devices.

Further, the phase transition temperatures of the liquid crystal compound were determined by observation by means of a differential scanning calorimeter and a polarizing microscope. S$_1$ and S$_2$ phases were not able to be determined. The results obtained are shown in Tables 1 and 2.

EXAMPLES 11 to 14

Liquid crystal characteristics of the 4'-n-decyloxybiphenyl-4-carboxylic acid-4"-(2,6-diemthylheptanoly)phenyl ester as obtained in Example 6 and the liquid crystal compounds as obtained in Examples 7 to 9 were determined in the same manner as in Example 10. The results obtained are shown in Tables 1 and 2.

COMPARATIVE EXAMPLES 1 and 2

Phase transition temperatures and various characteristics of the following comparative compounds having a structure relatively analogous to the compounds of formula (I) were determined in the same manner as in Example 10. Comparative Compound 1 is a compound wherein the optically active carbon atom is not adjacent to the CO group and exhibits relatively small spontaneous polarization. Comparative Compound 2 exhibits an S$_c$* phase at a relatively low temperature but has a small spontaneous polarization value and is not so fast in response time. The results obtained are shown in Tables 1 and 2.

Comparative Compound 1:

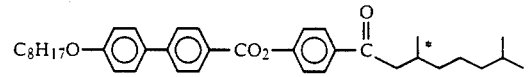

Comparative Compound 2:

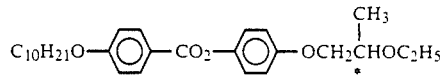

APPLICATION EXAMPLES 1 to 4

For the purpose of obtaining liquid crystal compositions which exhibit fast electro-optical response over a broader range of temperature of actual use, the liquid crystal compounds according to the present invention were mixed with various known liquid crystal compounds as shown below. Each of the resulting compositions was evaluated for response characteristics as a liquid crystal display element. The results obtained are shown in Tables 1 and 2.

| Application Example No. | Liquid Crystal Compound | mol % |
|---|---|---|
| 1 | 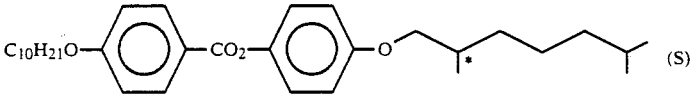 (S) | 41.4 |
|  | 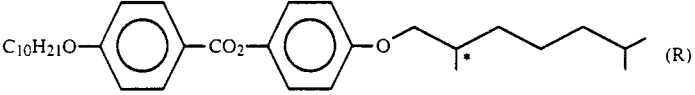 (R) | 49.7 |
|  | Compound of Example 6 | 8.9 |
| 2 | 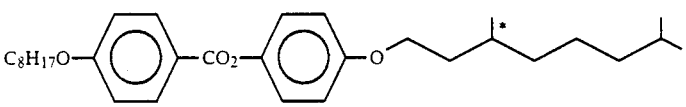 (S) | 33.7 |
|  | 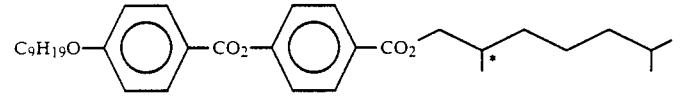 (S) | 20.0 |
|  | 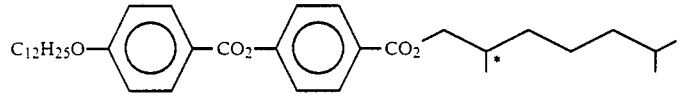 (S) | 21.7 |
|  | Compound of Example 5 | 24.6 |
| 3 | 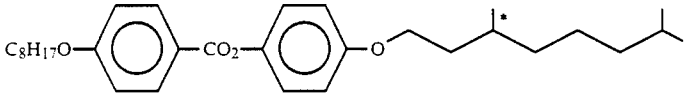 (S) | 34.6 |
|  | 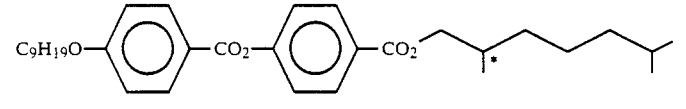 (S) | 20.3 |
|  | 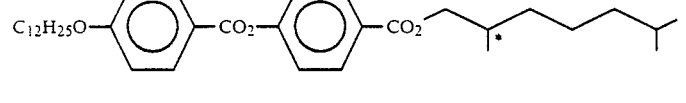 (S) | 22.0 |
|  | Compound of Example 6 | 23.1 |
| 4 | 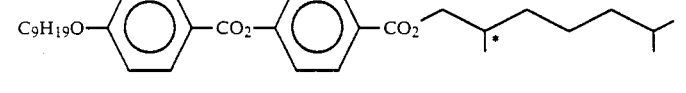 (S) | 17.3 |
|  | 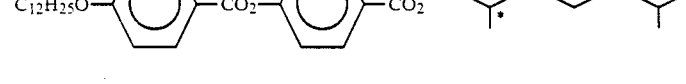 (S) | 18.5 |
|  |  (S) | 29.2 |

-continued

| Application Example No. | Liquid Crystal Compound | mol % |
|---|---|---|
| | 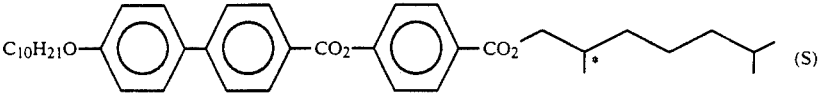 (S) | 21.1 |
| | Compound of Example 9 | 13.9 |

TABLE 1

| Example No. | Compound | Phase Transition Temperature (°C.) |
|---|---|---|
| 10 | Compound of Example 5 | $I \xleftarrow{152.4} S_A \xleftarrow{139.7} S_{C^*} \xleftarrow{83.3} S_1 \xleftarrow{82.0} Cr$ |
| 11 | Compound of Example 6 | $I \xleftarrow{147.9} S_A \xleftarrow{138.1} S_{C^*} \xleftarrow{83.7} Cr$ ; $\xrightarrow{84} S_1$ |
| 12 | Compound of Example 7 | $I \xleftarrow{184.6} S_A \xleftarrow{110.6} S_{C^*} \xleftarrow{69.5} S_1 \xleftarrow{64.7} Cr$ |
| 13 | Compound of Example 8 | $I \xleftarrow{137} S_A \xleftarrow{112} S_{C^*} \xleftarrow{102} Cr$ |
| 14 | Compound of Example 9 | $I \xleftarrow{55} S_A \xleftarrow{29.3} S_1 \xleftarrow{27} Cr$ |
| Comparative Example 1 | Comparative Compound 1 | $I \xleftarrow{174.3} S_A \xleftarrow{160.1} S_{C^*} \xleftarrow{101.2} S_1 \xleftarrow{86.2} S_2 \xleftarrow{53.1} Cr$ |
| Comparative Example 2 | Comparative Compound 2 | $I \xleftarrow{39.4} S_A \xleftarrow{36.7} Cr$ ; $\xrightarrow{27.8} S_{C^*} \xrightarrow{9} S_{G^*}$ |
| Application Example 1 | | $I \xleftarrow{66.3} S_A \xleftarrow{44.0} S_{C^*} \xleftarrow{39} Cr$ |
| Application Example 2 | | $I \xleftarrow{91.3} S_A \xleftarrow{52.5} S_{C^*} \xleftarrow{-3} Cr$ |
| Application Example 3 | | $I \xleftarrow{82.6} S_A \xleftarrow{52.0} S_{C^*} \xleftarrow{0} Cr$ |
| Application Example 4 | | $I \xleftarrow{89.3} S_A \xleftarrow{48.7} S_{C^*} \xleftarrow{8} S_1$ |

TABLE 2

| Example No. | Temperature (°C.) | $P_s$ (nC/cm$^2$) | Tilting Angle (°) | Response Time* (μ · sec) |
|---|---|---|---|---|
| Example 10 | 129.7 | 139.7 | 26.7 | 34 |
| | 99.7 | 241.2 | 31.8 | 35 |
| Example 11 | 128.1 | 132.7 | 27.7 | 33 |
| | 100 | 247.7 | — | — |
| Example 12 | 100.6 | 38.7 | 36.4 | 33 |
| Example 13 | 110 | 179 | 60 | 33 |
| Comparative Example 1 | 32 | 14 | — | 65 |
| Comparative Example 2 | 21 | 14 | — | 130 |
| Application Example 1 | 22 | 13.7 | 20.2 | 235 |
| Application Example 2 | 22 | 51.9 | 22.5 | 130 |
| Application Example 3 | 22 | 49.7 | 38.3 | 112 |
| Application Example 4 | 30 | 34.0 | 39.7 | 84 |

*response time corresponding to square wave of ±20 V

As described above, the liquid crystal compounds according to the present invention exhibit fast electro optical switching in image display devices and sufficiently meet the demand for high-density and large sized display devices.

While the invention has been described in detail and with reference to specific embodiments thereof, it will be apparent to one skilled in the art that various changes and modifications can be made therein without departing from the spirit and scope thereof.

What is claimed is:

1. A liquid crystal compound represented by formula (I):

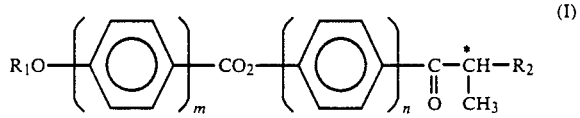

wherein $R_1$ represents a straight chain alkyl group having from 4 to 18 carbon atoms; $R_2$ represents a straight chain alkyl group having from 2 to 6 carbon atoms or a branched alkyl group having from 3 to 6 carbon atoms and having a methyl group as a side chain; m and n each represents 1; and wherein said liquid crystal compound exhibits a spontaneous polarization value of 220 $nC/cm^2$ or higher in its chiral smertic phase.

2. A liquid crystal composition comprising a liquid compound represented by formula (I):

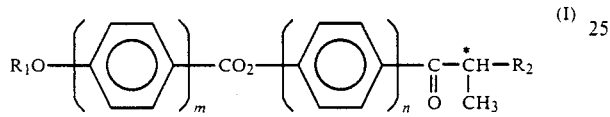

wherein $R_1$ represents a straight chain alkyl group having from 4 to 18 carbon atoms; $R_2$ represents a straight chain alkyl group having from 2 to 6 carbon atoms or a branched alkyl group having from 3 to 6 carbon atoms and having a methyl group as a side chain; m and n each represents 1; and wherein said liquid crystal compound exhibits a spontaneous polarization value of 220 $nC/cm^2$ or higher in its chiral smectic phase; and a liquid crystal compound exhibiting an $S_c$ phase, wherein said liquid crystal compound is different from said compound represented by formula (I).

3. A liquid crystal composition according to claim 2, wherein said compound of formula (I) is added to said different liquid crystal compound in a proportion of from about 5 to 20% by weight.

4. A liquid crystal compound as claimed in claim 1, wherein said compound is represented by formula:

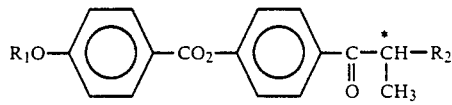

wherein $R_1$ represents a straight chain alkyl group having from 4 to 18 carbon atoms; and $R_2'$ represents a straight chain alkyl group having from 2 to 6 carbon atoms.

5. A liquid crystal compound as claimed in claim 1, wherein said compound is represented by formula:

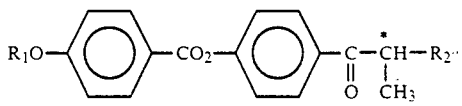

wherein $R_1$ represents a straight chain alkyl group having form 4 to 18 carbon atoms; and $R_2''$ represents a branched alkyl group having from 3 to 6 carbon atoms and having a methyl group as a side chain.

* * * * *